United States Patent [19]

Arway

[11] 4,067,020
[45] Jan. 3, 1978

[54] NONINTERRUPT INK TRANSFER SYSTEM FOR INK JET PRINTER
[75] Inventor: George Arway, River Grove, Ill.
[73] Assignee: A. B. Dick Company, Chicago, Ill.
[21] Appl. No.: 724,994
[22] Filed: Sept. 20, 1976
[51] Int. Cl.² ........................................ G01D 15/18
[52] U.S. Cl. ................................ 346/75; 346/140 R
[58] Field of Search ........................... 346/140 R, 75
[56] References Cited
U.S. PATENT DOCUMENTS 3,761,953  9/1973  Helgeson ............................ 346/75
3,930,258  12/1975  Dick ................................... 346/75
4,023,182  5/1977  Arway ................................ 346/75

Primary Examiner—Joseph W. Hartary
Attorney, Agent, or Firm—Lindenberg, Freilich, Wasserman, Rosen & Fernandez

[57] ABSTRACT

In an ink jet printing system, there is provided an arrangement whereby the ink, which is not used in printing, may be returned to the reservoir from which it was withdrawn, together with fresh ink, in a manner so that ink pressure fluctuations, together with shutdowns for filling the reservoir are avoided.

8 Claims, 1 Drawing Figure

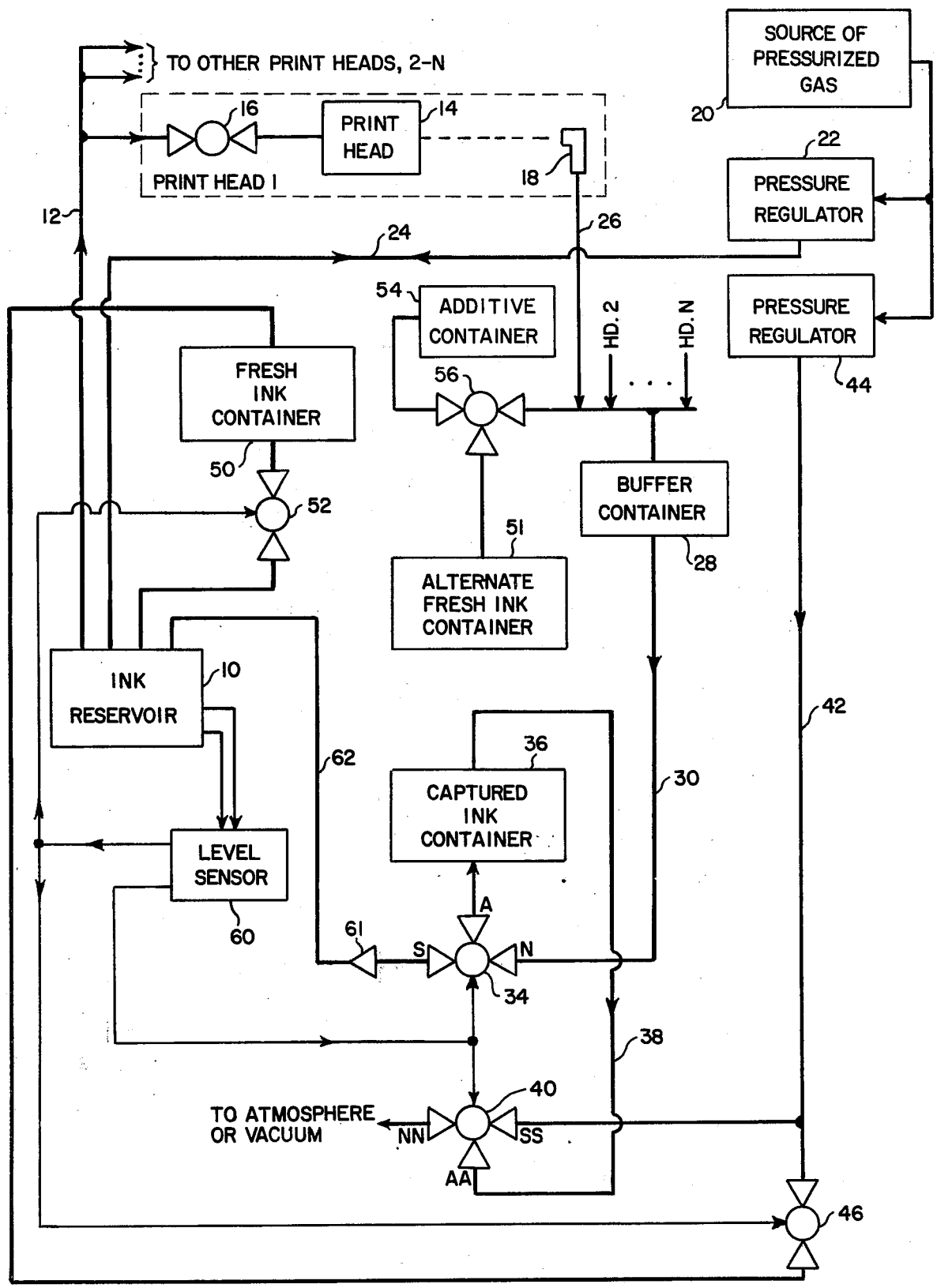

NONINTERRUPT INK TRANSFER SYSTEM FOR INK JET PRINTER

BACKGROUND OF THE INVENTION

This invention relates to an ink jet printing system, and more particularly to an improved method and means for maintaining a supply of ink for the printing system.

In the operation of a synchronous ink jet printing device, the ink jet nozzle is supplied with fluid ink, which is pressurized to typically between 2 and 5 atmospheres absolute pressure. Of the ink drops directed at a target surface, those which are not to be used in printing are captured and removed. This unused ink is then returned to the ink supply and recirculated through the system. The ink recirculation heretofore has been achieved by using a pump to supply pressurized ink to the nozzle and draw ink from a vented container. The return ink would be deposited in this vented container. The problems which arise with this method, are those of a low mechanical reliability of the pumps and valves, as well as the difficulty in obtaining chemical compatibility of different inks which are used. The pumps also produce cyclic pressure variations, pulses, which must be minimized by means of fluid pressure regulation. In order to avoid a deterioration in print quality a stable stream of constant velocity droplets must be provided. For this, an ink jet nozzle must be supplied with a non-varying ink pressure. Thus, the problems introduced by the pumps can adversely affect printing.

Another widely used method of fluid pressurization and recirculation, is to supply a nozzle with fluid ink which is forced out of a pressure vessel by a volume of a pressure regulated compressed gas. The returning unused ink is temporarily stored in another container. When the vessel from which ink is supplied to the nozzle is empty of ink (or nearly so), the ink recaptured from the ink drop stream is introduced into the pressure vessel, from the return ink container, by either automatic means, or manually while the pressure vessel is vented to the atmosphere. This method circumvents the problems associated with pump systems, however, the time which this type of system can operate continuously is limited by ink pressure vessel capacity and the number of nozzles being supplied.

OBJECTS AND SUMMARY OF THE INVENTION

An object of this invention is to provide for an ink jet printing system, an ink supply system which has the continuous operation capabilities of a pump system with the constant pressure supply of the compressed gas system.

Yet another object of this invention is to provide a novel and improved ink supply system for an ink jet printing system.

The above and foregoing objects of the invention may be achieved in an arrangement wherein an ink reservoir is pressurized to supply ink to the ink jet printing heads. Unused ink drops in the ink stream are captured and returned to a vessel which holds this ink either for a predetermined time or until the amount of ink in either the ink reservoir, or the returned ink vessel has reached a predetermined value. At that time the captured ink is returned under pressure to the ink reservoir. Provision is also made for adding an additive to the captured ink if it is of the type which requires the addition of an additive. Provision is also made for adding fresh ink to the ink reservoir when required. This fresh ink is either added under pressure to the ink reservoir or added to the returned ink vessel from which it will be subsequently transferred into the ink reservoir. As a result, the ink reservoir can continuously supply ink to the nozzle head at a constant pressure.

The novel features of the invention are set forth with particularity in the appended claims. The invention will best be understood from the following description when read in conjunction with the accompanying schematic drawing of the invention.

BRIEF DESCRIPTION OF THE DRAWING

The FIGURE is a schematic diagram for a fluid pressurization and recirculation system for an ink jet printer.

DESCRIPTION OF THE PREFERRED EMBODIMENTS

An ink reservoir 10 contains a supply of ink, which is fed over a supply hose 12, to the various printing heads represented by head 14, which are to use the ink. A two-way valve 16 is in the line to each printing head, for the purpose of cutting off the printing from the ink reservoir during testing, or when problems arise. Valve 16 is not an essential part of the invention.

Each printing head directs a stream of ink drops toward a printing surface, not shown. Those drops in the stream which are not used for the purpose of printing are directed at a catcher 18. The ink in the ink reservoir 10 is enabled to flow through the line 12, and the printing head and to be projected therefrom by means of a volume of compressed gas, usually air, supplied from a source 20, which may be a pump. The pressurized gas is applied to a pressure regulator 22, the output of which is supplied to the ink reservoir 10 by means of a line 24. The ink captured by the catcher 18, as well as by catchers used with other printing heads, are returned over a line 26, through a buffer container 28, a line 30, and a 3-way valve 34, to a captured ink container 36. The 3-way valve has three ports, designated as N, A and S. the top of the captured ink container is connected by a line 38 to another 3-way valve 40. This valve has three ports designated as NN, AA and SS. This 3-way valve may be operated so that port AA, may be connected to the atmosphere through port NN, or to a lower than atmosphere gas pressure (vacuum) if required for ink transfer, or may be connected through port SS over a line 42 to another pressure regulator 44.

A fresh ink supply container 50, which contains fresh ink, may be connected to the ink reservoir 10 by means of a valve 52. When the valve is operated, it enables passage of the ink therethrough. The fresh ink container 50 may be pressurized by being connected to the source of pressurized gas, through a valve 46, through line 42, and through pressure regulator 44.

Where the ink is of a type in which volatile ink base evaporation must be compensated for in order to reuse the captured ink, a reservoir 54 for holding additive is employed. When needed the additive may be allowed to be mixed with the incoming captured ink by means of a three-way valve 56.

Valves 34, 40, 46, 56 and 52, may be under control of a level sensor 60, if that mode of operation is desired, or under time control, or under any other desired control system for replenishing the ink in the ink reservoir. The level sensor is being cited by way of example. When the ink reservoir drops to a predetermined level, it applies a control signal to the valves 34 and 40. Valve 34, when not supplying ink to the ink reservoir 10, is set to permit captured ink to flow into the container 36. In response to the level sensor signal, valve 34 is operated to connect port A to port S. Valve 40, which otherwise connects the top of the container 36 to the atmosphere or to a source of vacuum, if desired, through ports AA and NN of the 3-way valve 40, is also operated in response to the signal from the level sensor, to connect the pressure regulator 44, through ports SS and AA, and the line 38, to the top of the captured ink container 36. As a result, the captured ink flows out of the container 36, over a line 62, into the ink reservoir 10. Check valve 61 in line 62 prevents ink backflow.

Fresh ink may be made to flow at any time into the ink reservoir 10, by operating the two-way valve 46 so that pressurized gas is applied from the source 20, through the pressure regulator 44 and the two-way valve 46 to the top of the fresh ink container 50. However, it may be more desirable to add fresh ink when the amount of the ink in the reservoir 10 attains a predetermined value which may be different than the value at which the captured ink is added to the contents of the container. At that time, a level sensor 60 can provide a signal which operates valves 52 and 46 to enable fresh ink to be supplied to the ink reservoir until the level of the ink in the ink reservoir 10 has attained a predetermined value with which time the two-way valves 46 and 52 are operated to turn off the flow of fresh ink to the ink reservoir 10. Level sensing arrangements for providing the indicated electrical signals in response to different ink levels being attained, are well known and therefore their details will not be described.

The buffer container 21 acts to collect the captured, or returned ink during the interval where the captured ink container 36 is supplying ink to the ink reservoir 10, since during that interval, port N of valve 34 is closed. It is connected via line 29 to the atmosphere or to a suitable source of vacuum, if vacuum is required to draw captured ink into the captured ink container.

Pressure regulator 44 provides a slightly higher pressure than pressure regulator 22, in order to enable ink to flow from the containers 36 and 50 to ink reservoir 10, which at the time that ink flows from these containers is desired, ink reservoir 10 is pressurized from pressure regulator 22. The pressure in ink reservoir 10 is at all times controlled by regulator 22.

The foregoing invention enables the ink supply to the printing heads to be maintained at a constant pressure and there is no need to interrupt the operation for refill of the ink supply in the container 10. The invention is not ink capacity limited. Reservoir 10 and fresh ink container 50 can be made as large or as small as is required for the type of printing to be conducted with the system.

An alternate method of adding fresh ink to the system is to connect a vented (to atmosphere) fresh ink container 51 to the ink return line 20 via three-way valve 56. Valve 56 may be operated to admit either additive or fresh ink as required. While this arrangement may be slower, it eliminates the need for valves 46 and 52 and eliminates the necessity of fresh ink container 10 being a pressure vessel. With this arrangement fresh ink flows into the captured ink container. When ink is made to flow from the captured ink container to the ink reservoir 10, it will contain either fresh ink, or captured ink, or a mixture of both. Of course it is possible to include both arrangements in the same device. Operating conditions would dictate which arrangement to use.

There has accordingly been described herein a novel and useful ink supply system for an ink jet printing system.

I claim:

1. An ink jet printing system of the type wherein ink is supplied from a reservoir to a nozzle to be projected thereby as a stream of drops toward a target, some of the drops in said stream being deflected for printing on said target, the remaining ink drops in said stream being captured, the improvement comprising:
   means for supplying a pressurized gas,
   a first pressure regulator for applying gas at a first pressure from said means to said ink reservoir to thereby cause ink to flow out of said reservoir to said printing head,
   a captured ink container,
   a first valve means connected to said captured ink container, said first valve having a first position for enabling captured ink to be directed to said captured ink container, and a second position for closing said captured ink container and for directing ink from said captured ink container into said ink reservoir,
   means for applying gas at a pressure higher than said first pressure to said captured ink container when said valve means is in its second position,
   means for operating said first valve means from its first, to its second position and from its second to its first position,
   a container for fresh ink, and
   a second valve means having a first position for enabling ink to flow from said fresh ink container to said ink reservoir, and a second position for preventing the flow of fresh ink from said fresh ink container to said ink reservoir.

2. An ink jet printing system as recited in claim 1 wherein said second valve means includes means for connecting said second valve means, when in its first position, to said first valve means, when in its first position, to enable the flow of both captured ink and fresh ink to said captured ink container.

3. An ink jet printing system as recited in claim 1 wherein said second valve means includes means connecting said second valve means directly between said fresh ink container and said ink reservoir.

4. An ink jet printing system of the type wherein ink is supplied from a reservoir to a nozzle to be projected thereby as a stream of drops toward a target, some of the drops in said stream being deflected for printing on said target, the remaining ink drops in said stream being captured, the improvement comprising:
   means for supplying a pressurized gas,
   a first pressure regulator for applying gas at a first pressure from said means to said ink reservoir to thereby cause ink to flow out of said reservoir to said printing head,
   a captured ink container,
   a first valve means connected to said captured ink container said first valve, having a first position for enabling captured ink to be directed to said captured ink container, and a second position for preventing further input of captured ink to said captured ink container and for directing ink from said captured ink container to be introduced into said ink reservoir, means for applying gas, at a pressure higher than said first pressure to said captured ink container when said valve means is in its second position, means responsive to the level of the ink in said ink reservoir for operating said first valve means from its first to its second position, and from its second to its first position.

a container for fresh ink, a second valve means having a first position for enabling ink to flow from said fresh ink container to said ink reservoir, and a second position for preventing the flow of fresh ink from said fresh ink container to said ink reservoir, and means for applying gas, at a pressure higher than the first pressure, from said source of pressurized gas to said fresh ink container when said second valve is in its first position, whereby ink may flow from said fresh ink container into said ink reservoir through said second valve means.

5. In an ink jet printing system as recited in claim 4 wherein said means for applying pressure from said source of pressurized gas to said captured ink container at a second pressure includes:

a second pressure regulator means connected to said source of pressurized gas for enabling gas to flow at said second pressure therethrough, a third valve means having a first position for connecting the output of said second pressure regulator means to said captured ink container, and a second position for blocking the flow of gas from said second pressure regulator and for connecting said captured ink container to a source of gas at a pressure lower than said first pressure, and said means for operating said first valve means from its first to its second position and then back to its first position includes means for simultaneously operating said third valve means from its first to its second position when said first valve means is operated from its second to its first position and for operating said second valve means from its second to its first position when said first valve means is operated from its first to its second position.

6. An ink jet printing system as recited in claim 4 wherein said means for introducing said captured ink into said captured ink container includes a buffer container for holding the captured ink when said first valve means is in its first position.

7. An ink jet printing system of the type wherein ink is supplied from an ink reservoir to a nozzle to be projected thereby as a stream of drops toward a target, some of the drops in said stream being deflected for printing on said target, the remaining ink drops in said stream being captured, the improvement comprising:

a container for said captured ink, means for transferring said captured ink into said captured ink container, means for transferring ink from said captured ink container into said ink reservoir including, first means for pressurizing said captured ink container to a pressure greater than the pressure in said ink reservoir during the transfer of ink and for discontinuing the pressurization upon the termination of said ink transfer, a fresh ink container, and means for transferring ink from said fresh ink container to said ink reservoir, said ink transferring means including second means for pressurizing said fresh ink container to a pressure greater than the pressure in said fresh ink reservoir and for discontinuing the pressurization when said transfer of ink to said ink reservoir is discontinued.

8. An ink jet printing system of the type wherein ink is supplied from an ink reservoir to a nozzle to be projected thereby as a stream of drops toward a target, some of the drops in said stream being deflected for printing on said target, the remaining ink drops in said stream being captured, the improvement comprising:

a container for said captured ink, means for transferring said captured ink into said captured ink container, means for transferring ink from said captured ink container into said ink reservoir including:

first means for pressurizing said captured ink container to a pressure greater than the pressure in said ink reservoir during the transfer of ink and for discontinuing the pressurization upon the termination of said ink transfer, a fresh ink container, and means for transferring ink from said fresh ink container to said ink reservoir including, means for transferring ink from said fresh ink container to said captured ink container when said means for transferring ink from said captured ink container into said ink reservoir is inoperative.

* * * * *